United States Patent [19]
Macharg

[11] 3,886,428
[45] May 27, 1975

[54] ELECTRONIC CONTROL SYSTEM FOR BATTERY CHARGERS

[76] Inventor: James Adrian Macharg, Bancroft House, Melbury Rd., Newcastle-Upon-Tyne, England

[22] Filed: May 14, 1974

[21] Appl. No.: 469,763

[30] Foreign Application Priority Data
May 17, 1973 United Kingdom............. 23535/73

[52] U.S. Cl. .................... 320/39; 320/21; 320/48
[51] Int. Cl. ............................................. H02j 7/10
[58] Field of Search ............. 320/20, 39, 40, 48, 30

[56] References Cited
UNITED STATES PATENTS
3,624,481  11/1971  Macharg ............................. 320/39
3,800,208  3/1974  Macharg ........................... 320/39 X

*Primary Examiner*—J. D. Miller
*Assistant Examiner*—Robert J. Hickey
*Attorney, Agent, or Firm*—Toren, McGeady and Stanger

[57] ABSTRACT

An electronic control system for battery chargers in which the charging current is switched on and off at predetermined intervals of time, and the magnitude of the charging current during the ON periods is controlled from a signal produced from the electronic control system. On switching OFF the charging current at each cycle of operation, the rate of decay of battery voltage is utilized to form a control signal, having first removed the voltage drop on switch off due to the ohmic resistance of the battery, known as the "I.R Drop." Having extracted the "I.R Drop," the remaining rate in decay in voltage representing the "Gas Drop" due to potential changes in the layer of gas on the active surfaces of the electrode, is compared with a standard reference voltage, the result of said comparison being utilized to vary the magnitude of the charging current in accordance with the state of charge of the battery as determined by the rate of decay of battery terminal voltage, due to the "Gas Drop."

16 Claims, 11 Drawing Figures

ELECTRONIC CONTROL SYSTEM FOR BATTERY CHARGERS

FIELD OF THE INVENTION

The present invention relates to electronic control systems for battery chargers.

When putting a battery "On Charge," it is highly desirable that this should entail no more than attaching leads from the charger to the battery terminals, thereby making for simplicity and reliability, and above all, removing the human element which may provide such forces as accident or misjudgement.

In the idealized charger, switch-on should be automatic, after the battery has been connected for a safe period, current control should compensate fully for the states of charge and settle of the battery, the end-current should be safe and satisfactory and perhaps termination may be automatic. Above all, the temperature, age and condition of the battery must be compensated for.

In the past, various methods have been used in an effort to attain the aforementioned compensations and controls with greatly varying degrees of success. In particular, a really adequate compensation for temperature has proved elusive.

Certain types of battery, notably the lead-acid type, require an amount of gassing to occur in order to hasten the complete charging of the more electrically remote particles and to prevent stratification of the electrolyte in layers of different specific gravity by ensuring mixing.

Experimental research appears to demonstrate firstly that chargeable particles electrically nearest to the terminals and in contact with the electrolyte charge first, and hence are liable to gas first because local current can no longer be absorbed by them to the same degree; secondly that as a cell charges up, particles more electrically remote from the terminals will commence to gas; thirdly that because nascent gas is capable of re-absorbtion, and because it represents an area of increased electro-chemical potential difference between the surface and core of a particle, it can speed the charging of the particle; fourthly that a given stage of charge and settle, the current may be increased to a point beyond which gas is generated most furiously, and it is believed that this point represents the occasion of all available surface area of the particles of the electrode being covered with a layer of nascent gas.

Unabsorbed nascent gas has a tendency to combine in bubbles which are released. If the current is such that the entire available area of the particles within an electrode are covered with nascent gas, any increase in current can only generate more gas because the electro-chemical potential difference can be increased no further.

Combination of the four points referred to above would seem to suggest that the shortest conceivable charging time may be obtained by reaching as quickly as possible the point where maximum permissible gassing occurs, and thereafter holding the charging current at a reducing level such that complete polarization of all available particle area is just maintained.

It will be appreciated that the decay curves produced at the terminals by removing the terminal current represent some integral or average of the various rates of gas release, gas re-absorbtion, and settling, which occur at different points in the electrodes. It will also be realized that when the most remote particles have their surfaces completely polarized, those electrically nearer the electrodes will tend to be generating gas quite quickly. However, it is believed that the nascent gas around the particle is at least in part absorbable by the adjacent particle, so that there may exist "gradients" of gas absorbtion and gas generation, which are complementary to each other, as well as a "gradient" of charge, between those points which are electrically adjacent to and those which are remote from the terminals.

As the battery charges up, these gradients will become less and less steep, and in the unrealizable ideal will be non-existent at full charge of the battery.

Examination of the decay of the open circuit terminal voltage of a battery shows three distinct phases, thus:

a. The instantaneous drop across the ohmic resistance of the battery upon the removal of charging current, hereinafter called the "I.R Drop."

b. A fairly rapid drop of relatively high magnitude believed to represent the change of potential due to changes in the layer of gas on the active surfaces of the electrode, hereinafter loosely called the "Gas Drop."

c. A slow drop of relatively low magnitude believed to be due to the settling of the charge across the active materials within the battery, hereinafter called the "Settling Rate."

In the decay curve, of course, these three phases run smoothly into each other, so providing a smooth curve which appears to approximate to a rectangular hyperbola, offset vertically by the back E.M.F. of the battery in the fully settled state, the "knee" of the hyperbola being the junction of the "Gas Drop" and the "Settling Rate."

Strictly speaking, the battery is settling during the period which is called the "Gas Drop," so that the said period is in fact a combination of these two effects, because the "Settling Rate" is by far the slower of the two, and the approximation is thus of a reasonable order.

Again, strictly speaking, it is believed that the "Gas Drop" is a rapid exponential function, and that the "Settling Rate" is a slow exponential function, the combination of the two merely appearing to approximate to a rectangular hyperbola.

The rates of decay of the two portions of the curve vary with state of charge, stage of settle, and if the battery has not reached the gassing state, the "Gas Drop" will hardly be apparent: the "knee" occurs higher with a charged battery than it does with a discharged battery; and finally, the "Settling Rate" is greater with a discharged battery than it is with a charged battery. These effects are reasonably consistent in character with change in temperature within the battery, though such change will modify them in degree.

When a battery is hotter the active materials are more active. This means essentially that the "Gas Drop" and settling rates are more rapid, and that inevitably the "knee" of the decay curve occurs earlier. When a battery is cooler, the converse is the case, and the "knee" is less pronounced.

With regard to the instantaneous drop of the terminal voltage due to the cessation of current through the ohmic resistance of the battery, loosely called the "I.R Drop" this will tend to be high in the early stages of charging if the terminal current is held high in order to speed charging, more especially if any sulphation is present in the electrodes. It may also tend to rise if the gas layer is complete, the gas acting rather like an insulator, but this effect tends to be offset in practice because as the battery charges up, a lower and lower terminal current is called for to maintain a complete gas layer.

It is thus clear that the "I.R. Drop" is closely bound up with the "Gas Drop" to one degree or another, and it has been found that electronic differentiation of the initial part of the decay curve including the "I.R. Drop" and the "Gas Drop" in combination provides a fair measure of the rate of gas generation whatever the states of charge and settle of the battery.

However, in the case of a very cold battery, or a battery having a significant degree of sulphation on its electrode surfaces, the ohmic resistance may be so high that the "I.R. Drop" is embarrassingly high. If this occurs, it may become desirable to endeavour to nullify the effects of the "I.R. Drop" so that the "Gas Drop" may itself be monitored with greater accuracy.

Because, the existence of the "Gas Drop" depends upon the existence of gas, the "Gas Drop" itself can be used as a control parameter in order to control the charging current.

DESCRIPTION OF THE PRIOR ART

Hitherto, attempts to utilize the "Gas Drop" have been made by comparing the terminal voltage with a reference voltage by causing the current to be cut off when the terminal voltage reached the reference voltage. One such battery charging system is disclosed in my U.S. Pat. No. 3,624,481.

Another method has been to relate the decay of terminal voltage to a reference voltage by turning on the charging current for only a certain period each time the terminal voltage had dropped to the reference voltage, the decay being examined after each period of charging current. One such battery charging system is disclosed in my U.S. Pat. No. 3,800,208.

Both of these methods provide a means of control which tends to be temperature dependent because the terminal voltage of a battery on charge varies with temperature.

SUMMARY OF THE INVENTION

In absolute contrast to the above two methods, the present invention does not utilize any form of predetermined reference voltage in the derivation of the "Gas Drop."

It is an object of the present invention to provide a control system for a battery charger whereby an output signal is generated by which the value of the charging current may be controlled regardless of the temperature of the battery, but otherwise taking full account of the state of charge and condition of of the battery as charging proceeds.

According to the present invention there is provided an electronic control system for a battery charged including: means for switching on and off the charging current at repetitive intervals in order to provide an open-circuit terminal voltage during the "off" periods; means for providing a signal for controlling the magnitude of the charging current; means for extracting the resultant "I.R. Drop" at the battery terminals; means for differentiating the rate of decay of the open circuit terminal voltage of the battery at the said repetitive intervals; means for deriving a voltage which is some function of the differential at the repetitive intervals; means for comparing this voltage derived from the differential with a standard voltage; and means utilizing the difference between said two voltages in order to modify the control signal whereby the magnitude of the charging current is controlled.

The derived voltage which is some function of the differential may be either the peak voltage of the differential or a voltage which is slightly less than the peak voltage. In the latter case this may be achieved by allowing the voltage to decay from the peak value in a predetermined time or by preventing the voltage being generated until the peak has passed.

In one preferred form, the means for differentiating the rate of decay, differentiates the terminal voltage after the "I.R. Drop" has been extracted.

In a second preferred form, two differentiators are provided, the first differentiating the terminal voltage after the "I.R. Drop" has been extracted and the second differentiating the terminal voltage including the "I.R. Drop," the output from the first differentiator being supplied to the means for deriving a voltage which is some function of the differential, and additionally an AND gate is provided which receives an output from both the comparator means and the second differentiator, whereby the control signal is modified.

In a third preferred form, the means for differentiating the rate of decay differentiates the terminal voltage after the "I.R. Drop" has been extracted and additionally an AND gate is provided which receives an output from the comparator means and an output from the differentiator means, whereby the control signal is modified.

Thus, it will be appreciated that the decay curve of the terminal voltage is examined by direct means from whatever the level of the terminal voltage was immediately before the charging current is switched off, and the level of the terminal voltage is allowed to be a function of the battery temperature. Furthermore, in order to examine the "Gas Drop" more accurately, the decay curve may be examined by similar direct means from the level of the terminal voltage shortly after the current is switched off in order to obviate the effects of the instantaneous "I.R. Drop."

Preferably, means are provided for generating said standard voltage, said means in one preferred form consisting of a zener diode and potentiometer arranged in parallel in series with a resistor across a supply voltage.

The means for switching on and off the charging current may be a timer which controls a switched output stage to effect the switch on and off of the charging current.

The mark space ratio and the total length of the cycle of said timer may be adjustable to suit different requirements.

BRIEF DESCRIPTION OF THE DRAWINGS

The present invention will now be described in greater detail by way of example with reference to the accompanying drawings, wherein.

DESCRIPTION OF THE PREFERRED EMBODIMENTS

Figure 1:
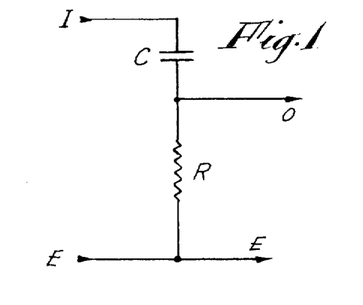
FIG. 1 is a circuit diagram of the simplest known form of differentiator, being a capacitor and resistor in series.

Referring first to FIG. 1, the simplest form of differentiating circuit includes a capacitor C and a resistor R. The operation of this circuit is well known. If, an instantaneous change of voltage is applied to the input terminals IE, then the output at the terminals OE will be a pulse with a nearly instantaneous leading edge and an exponential decay on its trailing edge.

Figure 2:
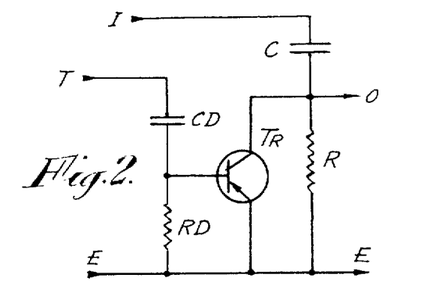
FIG. 2 is a circuit diagram of a similar differentiator having additional components for the purpose of delaying the commencement of the process of differentiation.

Referring now to FIG. 2, the same differentiating circuit is used in conjunction with additional components for delaying the start of the differentiation process. A transistor TR is connected across the resistor R in such a way that when the transistor TR conducts it effectively short-circuits the resistor R. The base electrode of the transistor TR is fed from a second differentiating circuit, consisting of a capacitor CD and a resistor RD, whose input terminals are TE. In operation, application of a pulse to the terminals TE synchronously with a pulse to the input terminals IE will cause the transistor TR to conduct for as long as it takes the capacitor CD to charge up through the resistor RD. As the capacitor CD charges up, the voltage across the resistor RD is reduced thus turning off the transistor TR.

Because the differentiating resistor R is short circuited by the transistor TR whilst the latter is conducting, the voltage across the differentiating capacitor C will tend to follow the input signal very rapidly, that is to say significant differentiation will not occur.

When the capacitor CD has charged up to such an extent that the current through the resistor RD is not able to maintain a sufficient bias on the base electrode to hold the transistor TR in the conducting state, then the process of differentiation will commence. By means of this basic circuit an instantaneous change in input signal to the terminals IE may be caused to be ignored, but any following change may be differentiated.

The circuitry of FIGS. 1 and 2 may be convenient when followed by a stage having two input terminals one of which is the earth line.

Figure 3:
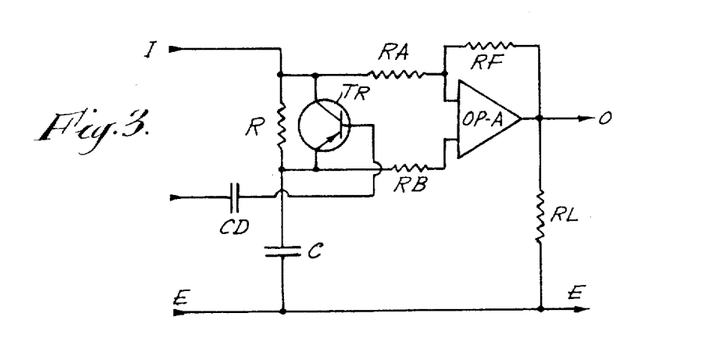
FIG. 3 is a modified version of FIG. 2 suitable for use in conjunction with an amplifier having differential input terminals and illustrating additionally an operational amplifier.

Referring now to FIG. 3, the circuitry has been rearranged so as to be convenient for following by a stage having differential input terminals and a typical arrangement using an operational amplifier OP-A is illustrated. All the components of FIG. 2 are present with the exception of the resistor RD which is omitted so as to be replaced with the input resistance of the base electrode of the transistor TR.

The voltage which appears across the resistor R is applied to the differential input terminals of the operational amplifier OP-A through series input resistors RA and RB. The output of the operational amplifier appears across the load resistor RL at the terminals OE. A resistor RF is provided as a feedback resistor for gain control. The stage consisting of the resistors RA, RB, RF, RL and the operational amplifier OP-A is a conventional circuit arrangement the usual supply connections and null-balancing devices being omitted for the sake of clarity.

In operation, the components R, C, CD and TR behave in similar manner to their counterparts in FIG. 2.

Figures 4A, 4B:
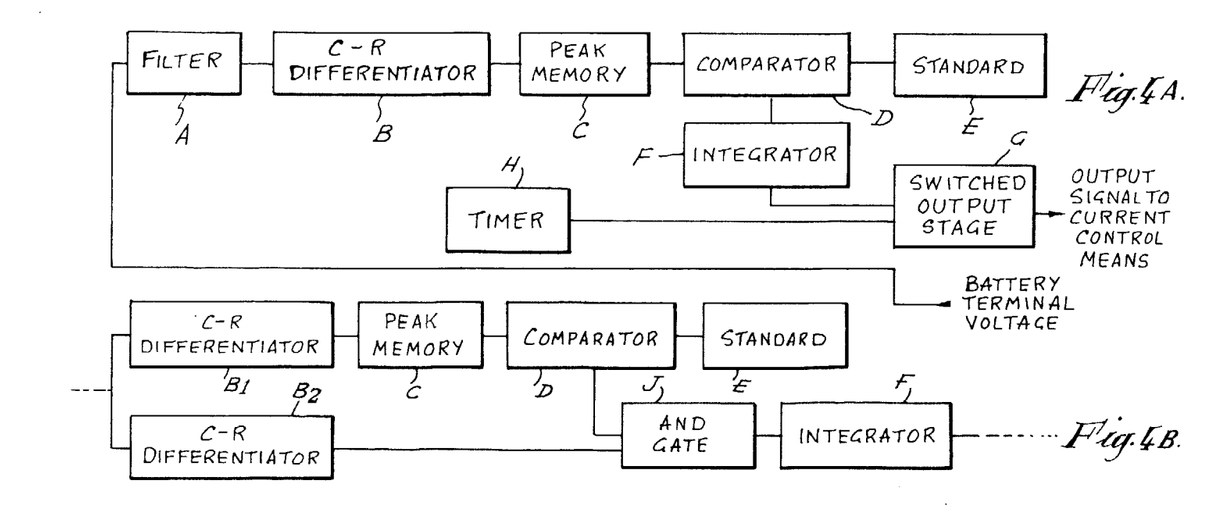
FIG. 4A is a block schematic diagram illustrating in the simplest form, one preferred form of a control system for a battery charger utilizing the rate of decay of terminal voltage from a level which is not predetermined.
FIGS. 4B and 4C are block schematic diagrams illustrating alternative forms of the control system shown in FIG. 4A.

Referring now to FIG. 4A, the basic circuit includes blocks A to H whose function and operation will now be explained as follows. The block A is a filter by which most of the rectified A.C. component, which appears at the terminals of the battery whilst charging current is flowing, is prevented from reaching the block B which is a capacitor-resistor differentiator. The block H is a timer which actuates a switch in the switched output stage represented by the block G so as to cause at intervals a short interruption in the output signal from the said block G by which the charging current for the battery may be turned off for short periods. When the charging current is switched off, the terminal voltage of the battery decays, and the rate of the decay is measured by the block B. Because the rate of decay is largely exponential in character, the peak height differential produced by the block B is a function of the maximum rate of decay, which in turn is controlled positively by the rate of gas generation within the battery. The peak height of the differential is remembered by the block C which consists of a peak memory circuit having only short term characteristics and thence compared with a standard generated in the block E by a comparator represented by the block D. The output of the block D is arranged so that it is reduced by the excess of the peak remembered by the block C over the standard generated in the block E. Because the peak memory in the block C is only of the short-term type and deliberately inefficient, the remembered signal itself decays during the ensuing period when the timer H causes the charging current to be switched "ON." The difference between the inputs to the comparator D is thus of a varying nature, the output of the comparator being then integrated by the block F before causing the switched output signal to be smoothly reduced by the switched output stage represented by the block G at a rate determined by the excess of the differential as remembered by the peak memory C over the standard generated in the block E.

When the timer H causes the charging current to be switched off, if no gas, or little gas, is being generated, then the rate of decay of terminal voltage is slow and a low value of signal, as remembered by the peak memory C, does not exceed the standard generated in the block E. There is thus no reduction of charging current during the ensuing "ON" period.

Alternatively, if the battery is gassing heavily, the rate of decay of terminal voltage will be high, the peak memory C remembers a voltage in excess of that from the standard generated in the block E, so that the comparator D produces a reduced output accordingly, and the charging current is reduced.

Figure 5:
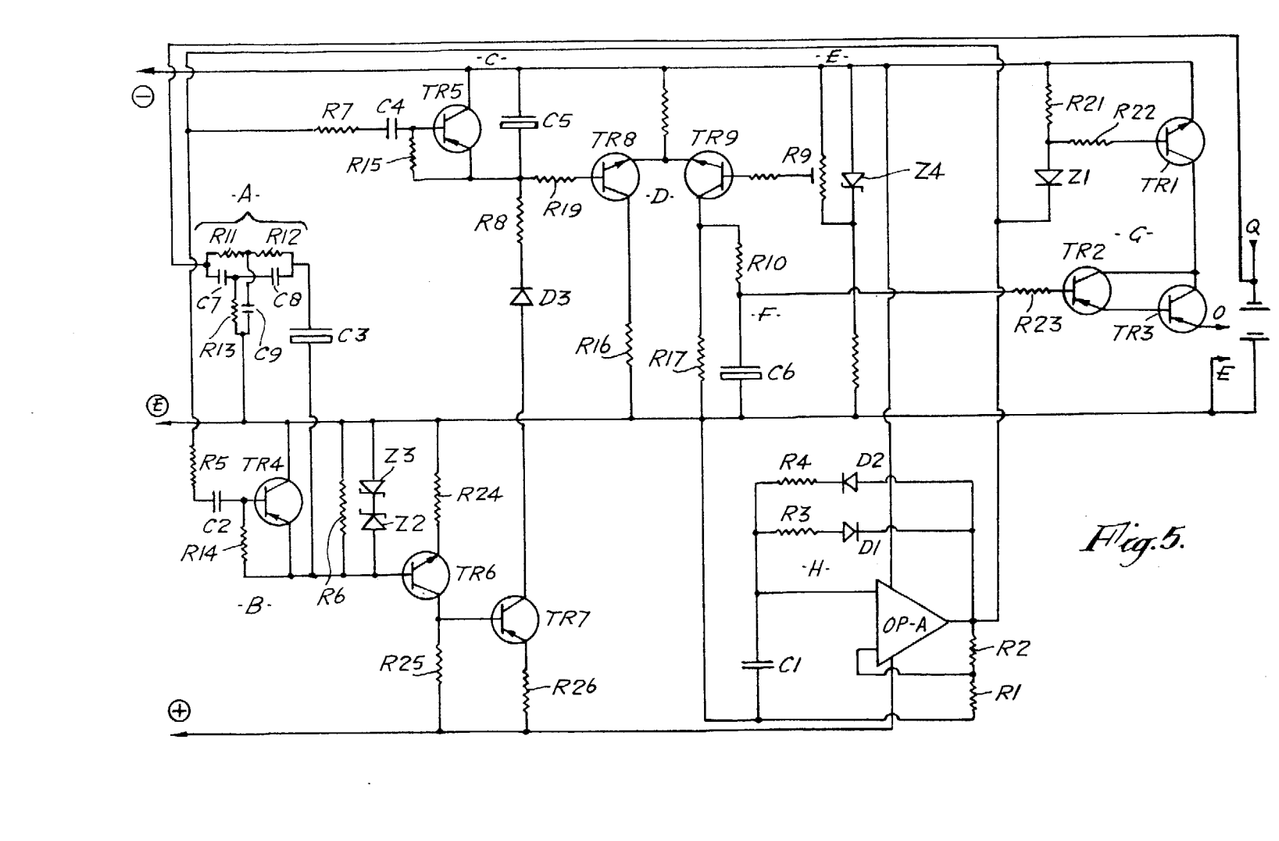
FIG. 5 is a detailed circuit diagram of the preferred form of control system which is shown in block form in FIG. 4A.

Referring now to the detailed circuit diagram shown in FIG. 5, the various blocks A to H of FIG. 4 contain the following components.

The filter of block A comprises resistors R11, R12, and R13 and capacitors C7, C8 and C9 arranged to form a low resistance parallel-T rejection filter.

The differentiator of block B comprises a transistor TR4, resistor R5, R6 and R14, capacitors C2 and C3 and zener diodes Z2 and Z3.

The peak memory of block C comprises a transistor TR5, resistors R7 and R15, and capacitors C4 and C5.

The comparator of block D comprises transistors TR8 and TR9, resistors R16, R17, R18, R19 and R20.

The standard voltage generator of block E comprises a zener diode Z4 and a potentiometer R9.

The integrator F comprises a capacitor C6 and a resistor R10.

The switched output stage of block G comprises transistors TR1, TR2 and TR3, a zener diode Z1 and resistors R21, R22 and R23.

The timer of block H comprises an operational amplifier OP-A1, resistors R1, R2, R3 and R4, diodes D1 and D2 and a capacitor C1.

In addition an amplifier interconnects blocks B and C. This comprises transistors TR6 and TR7, resistors R8, R24, R25 and R26 and a diode D3.

The detailed circuit diagram of FIG. 5 is that of a preferred form of control system for a battery charger operating on the gas-control principle. A supply voltage, which is symmetrical about earth, is applied to the negative, earth and positive terminals where indicated, whilst an output voltage appears at the terminals OE. This output voltage is a control voltage of which the charging current is arranged to be a function, and the charging current is applied across the battery via the earth line and the terminal marked Q.

It is convenient for the purposes of explanation to commence with the timing circuit which includes the operational amplifier OP-A. The output of the operational amplifier OP-A appears across a load consisting of the resistors R1 and R2 in series, feedback being applied from their junction to the non-inverting input of the amplifier. The capacitor C1 is connected between the inverting input of the amplifier and the earth line, and is alternately charged and discharged through the diode D2 and the resistor R4, and the diode D1 and the resistor R3. The ratio of the resistances of the resistors R3 and R4 decides the ON-OFF ratio of the timing circuit, whilst the cycle time is controlled by the values of the resistors R1 and R2. The timing circuit is said to be in the "OFF" condition when the output is negative so that the transistor TR1 is cut off through the level-shift zener diode Z1, so cutting off the supply to the transistors TR2 and TR3 which are arranged as a Darlington pair. This prevents an output at the terminals OE and so cuts off the charging current to the battery. Conversely, the timer is said to be in the "ON" condition when its output is positive, so turning on the transistor TR1 which then provides a supply to the Darlington pair TR2 and TR3 which conducts so that the output voltage at the terminals is a function of the voltage applied to the base electrode of the transistor TR2, which voltage effectively controls the output voltage and hence the charging current into the battery during "ON" periods.

It is convenient to consider that the timer has just turned "OFF", so cutting off the charging current. Simultaneously, a negative voltage is applied to the capacitor C2 of the differentiator B through a resistor R5, this voltage appearing as a pulse at the base electrode of the transistor TR4 so turning it "ON" for a period of time much shorter than the "OFF" period of the timer H. During this short period the main differentiating capacitor C3 is allowed to follow the instantaneous change in terminal voltage of the battery, through the low-resistance parallel-T rejection filter A, due to the removal of charging current through its internal resistance (the I.R. Drop) quite rapidly because the resistor R6 is short-circuited by the transistor TR4. Differentiation is thus prevented during this short period of the "OFF" time. Simultaneously, a negative voltage is applied to the capacitor C4 of the peak memory C through the resistor R7, and appears as a similar short pulse at the base electrode of the transistor TR5 which it turns on to ensure that the capacitor C5 is discharged. As the capacitors C2 and C4 charge up, the transistors TR4 and TR5 pass out of the conductive state and no longer by-pass the resistor R6 and the capacitor C5 respectively.

The terminal voltage of the battery continues to decay with the "Gas Drop" during the remainder of the "OFF" period, the rate of decay now being allowed to appear as a voltage across the resistor R6. The zener diodes Z2 and Z3 are protective devices to limit the excessive voltages which would otherwise appear across the resistor R6 upon connection or disconnection of the battery.

The voltage which appears across the resistor R6 is then amplified by the transistors TR6 and TR7 and applied through the diode D3 and the resistor R8 to charge the capacitor C5 proportionally. The capacitor then acts as a memory until it is discharged at the beginning of the next "OFF" period by the transistor TR5 which is again turned "ON" for a short time.

The voltage across the capacitor C5 is then compared with a preset voltage tapped off from the stabilizing zener diode Z4 by the potentiometer R9 by means of the differential amplifierr consisting of the transistors TR8 and TR9, the output of the transistor TR9 being integrated by the integrator consisting of the resistor R10 and the capacitor C6, whence it is applied to the base electrode of the transistor TR2 being the input terminal of the Darlington pair TR2 and TR3.

If the rate of decay of the battery terminal voltage is fast because the battery is gassing, the capacitor C5 will be charged to a higher voltage, and if this voltage is high relative to that tapped off from the potentiometer R9, then the conduction of the transistor TR9 will be reduced, so allowing the voltage across the capacitor C6 to decay, and hence the charging current to decay.

If the rate of decay of the battery terminal voltage is slow because the battery is not gassing adequately, then the voltage across the capacitor C5 may not be high enough to reduce the conduction of the transistor TR9, hence the voltage across the capacitor C6 will tend to increase.

Thus the voltage across the capacitor C6 tends to control the output voltage of the control system, and hence the charging current to the battery.

Because the basic control factor is in fact the "Gas Drop" which appears at the battery terminals during each "OFF" period, the precise transfer function between the control voltage and the charging current, which is introduced by the charging current control means, is very largely inconsequential provided that the said means is capable of controlling the charging current in an infinitely variable fashion between the limits of zero and maximum capability. The overall operation is effectively a "feedback" one where an error signal, i.e. the difference between the actual differential and that intended, is fed back in corrective mode. It is thus possible to use a given control system as described with various types of charging current control means provided only that they are arranged so as to be sensitive enough to be controlled satisfactorily by the output voltage available from the control system itself.

In the first alternative form of the control system shown in FIG. 4B, there are provided two differentiators B1 and B2 connected in parallel with respect to the output from the block A. The first differentiator B1 is exactly equivalent to the block B in FIG. 4A and feeds the peak memory C, the "I.R Drop" being extracted in the circuit as shown in FIG. 5. The second differentiator B2 has no means for extracting the "I.R Drop." Additionally, there is provided an AND gate J which provides an output to the integrator F for modifying the magnitude of the control signal passed by the switched output stage G. The AND gate receives one input direct from the second differentiator B2 and a second input from comparator D. When the battery is gassing heavily the two "high level" inputs to the AND gate produces a "high level" output to cause the integrator F to reduce the magnitude of the control signal and hence the charging current.

Figure 4C:
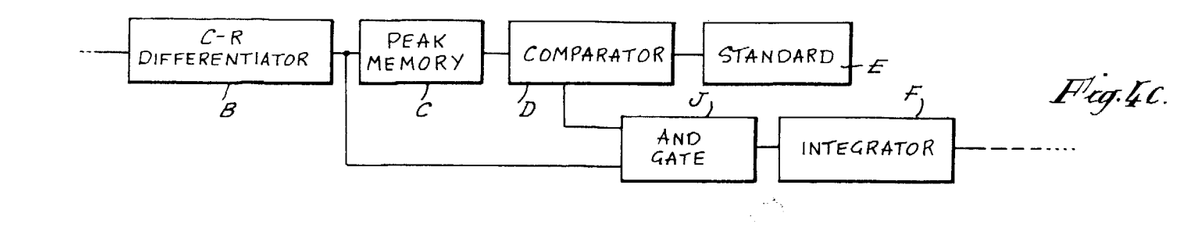

In the second alternative form shown in FIG. 4C, there is only one differentiator B which extracts the "I.R Drop" and the AND gate J receives a first input direct from the differentiator B and a second input from the comparator D. The circuit is otherwise the same in construction and operation.

Figure 6:
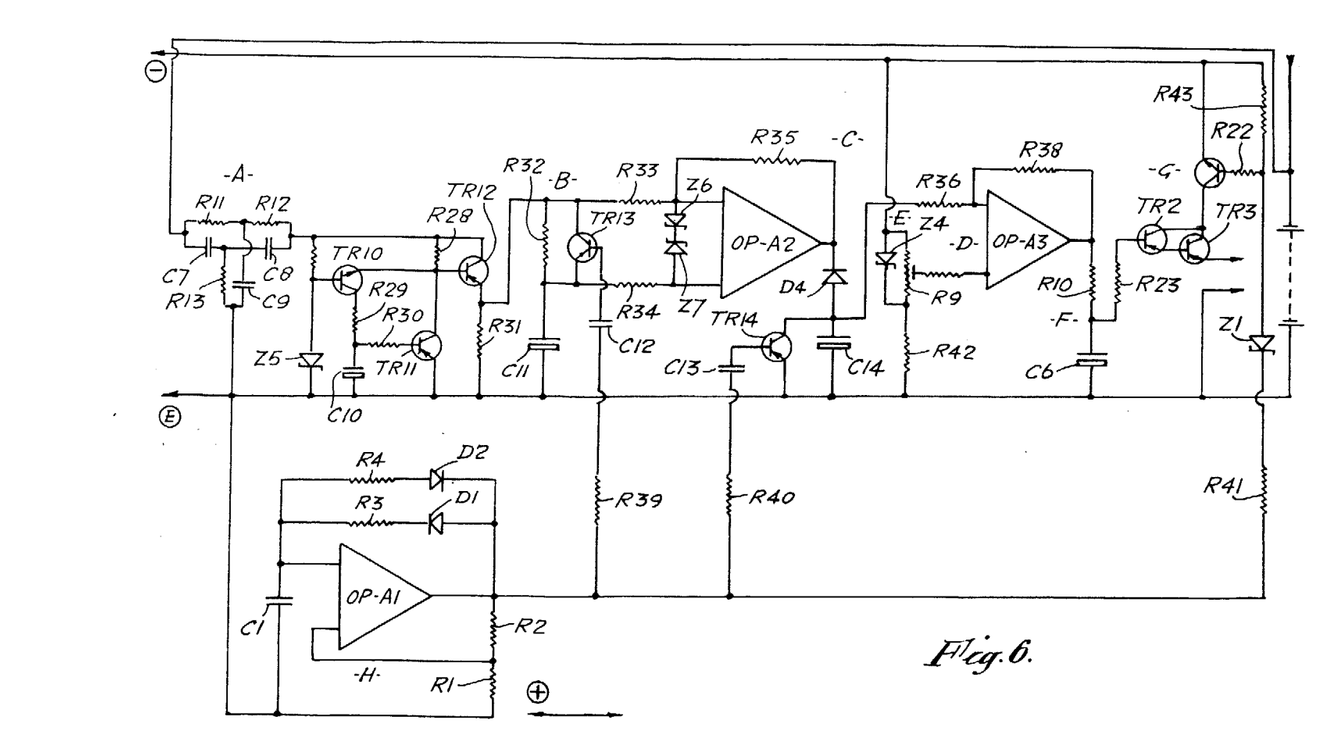
FIG. 6 is a circuit diagram of a second preferred form of a control system using mainly operational amplifiers.

Referring now to FIG. 6 which shows a modified arrangement of the circuit, the basic blocks of FIG. 4 containing the following components (like reference numerals being used wherever possible).

The filter A comprises resistors R11, R12 and R13 and capacitors C7, C8 and C9 arranged as in FIG. 5.

The differentiator B is of the same form as that shown in FIG. 3 and includes an operational amplifier OP-A2, capacitors C11 and C12, resistors R32, R33, R34, R35 and R39, a transistor TR13 and zener diodes Z6 and Z7.

The peak memory C comprises the capacitors C13 and C14, the transistor TR14, a resistor R40 and a diode D4.

The comparator D comprises an operational amplifier OP-A3 and resistors R36, R37 and R38.

The standard voltage generator E comprises as before a zener diode Z4 and a poteniometer R9.

The integrator F comprises a capacitor C6 and a resistor R10.

The switched output stage G comprises transistors TR1, TR2 and TR3, resistors R22, R23, R41 and R43 and a zener diode Z1.

The timer H comprises an operational amplifier OP-A1, resistors R1, R2, R3 and R4, diodes D1 and D2 and a capacitor C1.

The terminal voltage of the battery is fed through the filter A consisting of the resistors R11, R12 and R13, and the capacitors C7, C8 and C9, to a circuit containing transistors TR10 and TR11 which serves to provide a sample for differentiation which is an inverse function of the number of cells in the battery. The operation of this latter circuit will be separately described later with reference to FIGS. 7 and 8. The sample provided by the circuit is fed into an emitter-follower stage consisting of a transistor TR12 and a resistor R31, whose purpose is to act as a buffer having a low output resistance in order to feed the differentiator circuit including the resistor R32 and the capacitor C11.

The circuitry and its operation, from the output terminal of the emitter follower transistor TR12 to the output terminal of the operational amplifier OP-A2 is identical with that shown in FIG. 3. However, the output of the operational amplifier OP-A2 is not developed across a resistive load as in the case of the circuit shown in FIG. 3, but across the diode D4 and the capacitor C14 which acts as a memory to remember the differential peak.

The differential peak is fed into the inverting input terminal of the operational amplifier OP-A3 whilst a standard tapped off from the across the zener diode Z4 by the potentiometer R9 is fed into the non-inverting input of the operational amplifier through the resistor R37. The output from the differential amplifier is integrated by the integrating circuit consisting of the resistor R10 and the capacitor C6 before being applied to the base electrode of the transistor TR2 of the Darlington pair TR2 and TR3 through the resistor R23. The transistor TR1 is located in the commoned collector circuit of the Darlington pair and acts as a switch.

The output signal from the operational amplifier OP-A1 of the timer H is arranged to turn off the transistor TR1 whilst simultaneously turning on the transistors TR13 and TR14 by applying a short pulse through the capacitors C12 and C13 respectively as they charge up through respective resistors R39 and R40.

The principles of operation of the circuit are identical to those of the circuit shown in FIG. 5, with the addition of the circuitry containing the transistors TR10 and TR11 which enables a smaple of convenient dimensions to be differentiated regardless of how many cells may be in the battery.

When the timer H first switches off, the transistor TR1 is rendered non-conductive so cutting off the supply to the Darlington pair TR2 and TR3 whose emitter voltage (the control voltage for the charging current) immediately drops to zero and in consequence the battery terminal voltage commences to decay.

Simultaneously, a pulse is applied to the transistor TR13, which short-circuits the resistor R32 so allowing the capacitor C11 to follow rapidly the battery terminal voltage for a short part of the off period in order to prevent differentiation of the "I.R. Drop."

Simultaneously, a pulse is applied to the transistor TR14 which conducts so cancelling the memory of the capacitor C14.

After a short part of the off period, the transistors TR13 and TR14 once more become non-conductive and may be neglected until the next pulse is applied to their base electrodes. At this point, the resistor R32 is no longer short-circuited and a differential voltage builds up across it as the capacitor C11 attempts to follow the battery terminal voltage.

This differential voltage is fed into the differential inputs of the operational amplifier OP-A2, whose output is able to charge the memory capacitor C14 because the transistor TR14 is also non-conductive. The capacitor C14 tends to retain its charged voltage until discharged once more by the transistor TR14 at the beginning of the next off period. The voltage across the capacitor C14 is fed into the inverting input of the operational amplifier OP-A3 through the resistor R36, so tending to reduce its output signal.

The voltage tapped off from the zener diode Z4 by the potentiometer R9 is fed into the non-inverting input of the operational amplifier OP-A3 through the resistor R37, so tending to increase its output signal.

The operational amplifier OP-A3 is thus used as a differential amplifier, and is arranged so that when the voltage across the capacitor C14 exceeds that of the standard set by the potentiometer R9 then its output is reduced very rapidly.

If the battery has not commenced gassing heavily, then the output of the operational amplifier OP-A3 will be at maximum, hence the output of the integrator tends to build up.

If the battery is gassing heavily, the voltage across the capacitor C14 will greatly exceed the value of the standard, the output of the operational amplifier OP-A3 will drop to zero and the output of the integrator F will tend to reduce.

Because of the memory action of the capacitor C14, the integrator will be either charging or discharging approximately from the moment when the transistors TR13 and TR14 regain their non-conductive state, to the moment when they are next caused to be conductive.

When the timer H switches ON, the transistor TR1 is rendered conductive and allows the output of the Darlington pair TR2 and TR3 to develop according to the output of the integrator so as to turn on the charging current to the battery at the level determined by the action of the circuitry.

Because the control of charging current is effectively carried out by a battery condition (i.e. the onset of gassing) and because a battery will accept very high currents indeed before gassing occurs, the maximum limit of current need not be imposed by limiting the potential of the charging supply, whereby the current is a function of the difference between the charging potential and the battery terminal voltage, but rather by limiting the current to the safe output of the charging current supply. This means will allow the maximum output of the charger to be applied to any battery of any capacity, and of any number of cells up to the limit imposed by the potential of the charging supply, and hence batteries of small capacity will be brought up to the gassing condition rapidly, whilst batteries of large capacity will take longer, and within the ability of the charger ouput potential the battery may have any number of cells.

However, because the battery may have any number of cells, means is necessary to provide a sample of the terminal voltage which is inversely proportional to the number of cells in the battery in order that the gas-control circuitry may examine a rate of decay of terminal voltage which is independent of rather than affected by the number of cells in the battery.

Figure 7:
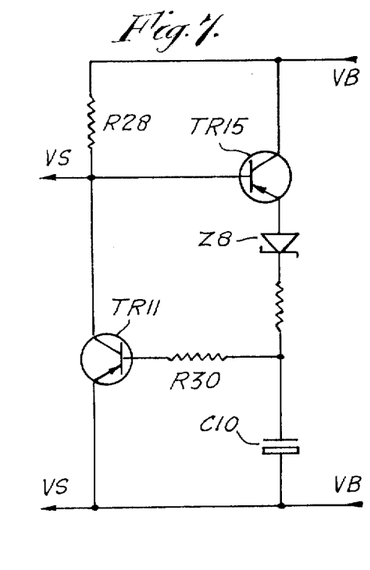
FIGS. 7 and 8 are circuit diagrams of two different simple electronic devices for providing automatically a sample of the terminal voltage of the battery in inverse proportion to the number of cells in the battery during charging.
Figure 8:
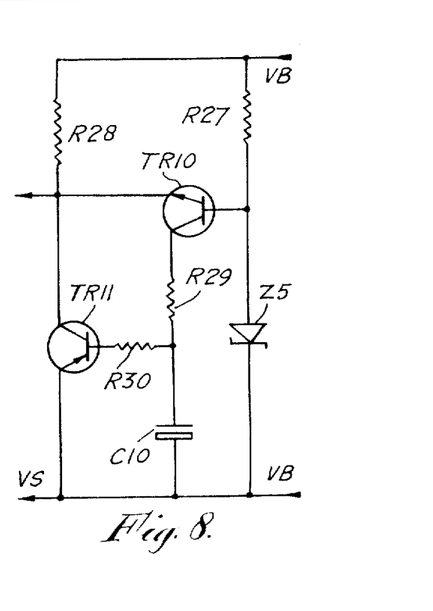

Referring now to FIGS. 7 and 8, there are shown circuit diagrams of two different electronic devices for automatically providing a sample of the terminal voltage in inverse proportion to the number of cells in the battery during charging.

FIG. 7 shows an embodiment in which a sample is tapped off from the battery terminal voltage by electronic means irrespective of the number of cells the battery has, whilst FIG. 8 shows an embodiment in which the maximum safe output current form the charger is applied to the battery regardless of the number of cells and its capacity, the circuit shown in the latter figure being the same as that shown in FIG. 6.

In both FIGS. 7 and 8, the fixed resistance is R28, the transistor whose output resistance is varied is TR11, the battery terminal voltage is applied to the terminals VB, and the sample is extracted from the terminals VS. Further components common to both circuits are the capacitor C10, the base resistor R30 and the resistor R29 in series with the capacitor C10. The remainder of the circuitry is somewhat different, but the overall operation is similar in effect.

In FIG. 7, when the sample voltage across the transistor TR11 exceeds the base-emitter-voltage a transistor TR15 and the breakdown voltage of the zener diode Z8 in combination, then the transistor TR15 conducts, so charging the capacitor C10 through the resistor R29, so increasing the current into the base of the transistor TR11 hence increasing the conduction but decreasing the output resistance of the latter in order to reduce the sample.

Hence the sample tends to remain near to the voltage at which the transistor TR15 conducts.

In FIG. 7, the transistor TR15 is obviously in emitter-follower configuration which provides a voltage gain nominally of unity and hence the efficiency of the circuit is largely dependent upon the gain of the transistor TR15.

In FIG. 8, the transistor TR10 is effectively used in earthed-base configuration which has an inherently high voltage gain so increasing the efficiency of the circuitry many times. In operation, when the sample across transistor TR11 exceeds the emitter-base voltage of transistor TR10 and the breakdown voltage of the zener diode Z5 in combination, the transistor TR10 is turned on, so charging the capacitor C10 through the resistor R29, so increasing the current into the base electrode of the transistor TR11 hence increasing the conduction but decreasing the output resistance of the latter in order to reduce the sample.

In order to understand the complete operation of both the circuits in FIGS. 7 and 8, it is convenient to view the short-term and the long term operation separately first and then in combination.

In the long-term, the two systems assume a state of balance wherein the voltage across the capacitor C10 assumes a steady-state value which maintains the conduction of the transistor TR11 at or about a constant value which depends upon the battery terminal voltage. Because of the integrating effect of the combination of the resistor R29 and the capacitor C10, which effectively retains a memory value, rapid short-term changes in battery terminal voltage applied to the terminals VB are reduced in value according to the relation RO/(R28+RO), wherein RO is the output resistance of the transistor TR11 which is held at a nominally constant value in the short-term.

Thus in the long-term, the output voltage across the transistor TR11, that is to say the sample voltage, tends to assume a constant value regardless of the number of cells in the battery, whilst short-term changes in the battery terminal voltage due to the interruption and replacement of charging current during the repeating sensing operations tend to be reduced in inverse proportion to the number of cells in the battery so that a sample of suitable proportions is examined by the gas-control system.

In practical terms it is largely immaterial whether circuitry of this embodiment is inserted before or after the filter for rejecting the charging frequency which appears at the battery terminals, but the type of filter chosen may influence this decision.

Figure 9:
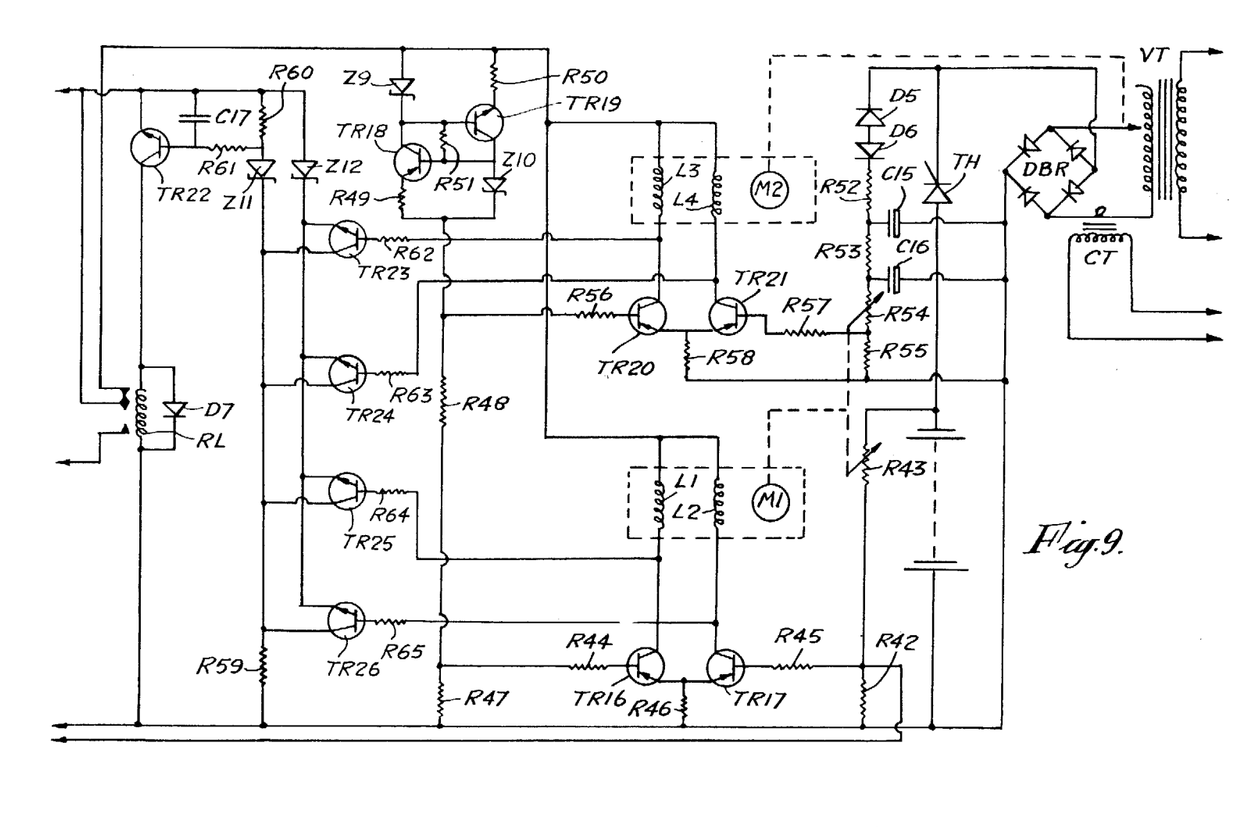
FIG. 9 is a circuit diagram of an additional equipment whereby the potential of the charging current is adjusted and a sample of the terminal voltage of the battery is tapped off in inverse proportion to the number of cells of the battery before charging commences.

Referring now to FIG. 9, the additional circuitry for enabling the control system of FIG. 5 or FIG. 6 to be used with a battery of any capacity and any number of cells includes a voltage transformer VT, a current transformer CT, a diode bridge rectifier DBR, a thyristor TH, servo motors M1 and M2, a relay RL, transistors TR16 to TR26, resistors R42 to R65, capacitors C15 to C17, zener diodes Z9 to Z12 and diodes D5 to D7.

The battery has connected across its terminals a potential divider consisting of a fixed resistor R42 and a variable resistor R43 driven by the motor M1.

The junction point between the resistors R42 and R43 is fed to one input of a differential amplifier consisting of transistors TR16 and TR17 having relay coils L1 and L2 in their collector circuits, series base resistors R44 and R45, and a common emitter resistor R46. The other input of the differential amplifier is fed from the junction between two reference resistors R47 and R48 in series across which reference voltages are developed by a constant current from a constant current source.

The constant current source is a ring-of-two, consisting of transistors TR18 and TR19, zener diodes Z9 and Z10, emitter resistors R49 and R50 and a starter resistor R51.

The relay coils L1 and L2 together with their respective contacts (not shown) are arranged to energize the motor M1 so as to increase the value of the variable resistor R43 when the voltage at the junction between resistors R42 and R43 is greater than the voltage at the junction between resistors R47 and R48 and vice versa, so that the two voltages tend to become equalized.

The voltage transformer is provided with a slider on the secondary side which is driven by the servo motor M2 to provide a variable secondary output voltage. The output voltage is rectified by a diode bridge rectifier DBR and thence passed to the control thyristor TH in series with the battery. The output of the bridge rectifier DBR is also passed through a plurality of diodes, only the first diode D5 and the last diode D6 being shown for clarity. The total forward resistance of the diode chain provides a voltage drop equivalent to that across the thyristor TH. The output then passes through a smoothing circuit consisting of resistors R52 and R53 and capacitors C15 and C16, and thence to a potential divider consisting of a variable resistor R54, which is ganged to the variable resistor R43 so as also to be driven by the motor M1, and the resistor R55. The variable potential dividers R42, R43 and R55, R54 bear a direct linear relationship to each other.

The junction between the resistors R55 and R54 is fed to one input of a differential amplifier, identical to that containing the transistors TR16 and TR17. This second differential amplifier consists of the transistors TR20 and TR21 having relay coils L3 and L4 in their respective collector circuits, series base resistors R56 and R57 and a common emitter resistor R58. The other input of this differential amplifier is fed from the negative end of the resistor R48 which is fed from the constant current source.

The relay coils L3 and L4 and their respective contacts (not shown) are arranged to energize the motor M2, which drives the tap of the variable transformer VT in such a way that, when the voltage at the junction between the resistors R55 and R54 is higher than the voltage at the negative end of the resistor R48, the output of the variable transformer VT is reduced in value, and vice versa, so that the two voltages tend to become equalized.

The constant current source, the two differential amplifiers and the two motors are fed via the contacts of the relay RL which when opened effectively lock the values of variable resistors R43 and R54 and the secondary voltage tapped off the variable transformer VT.

In operation, when there is a power supply to the variable transformer and a power supply to the control circuitry, a sample voltage is tapped from across the battery terminals by the potential divider R42 and R43 equivalent to the voltage across resistor R47, hence however many cells the battery possesses, a sample of convenient proportions is fed to the sensing circuitry.

At the same time, the rectified and smoothed charging supply has a sample tapped off it by the potential divider R55, R54 in similar proportions. This latter sample is then automatically adjusted to the value of the voltage across the resistors R47 and R48 in series by the driving of the tap of the variable power-transformer VT by the motor M2 in such a way that the difference between the charging potential and the battery terminal voltage bears a direct relationship to the number of cells in the battery as determined by the voltage across the resistor R48.

After connecting the battery, upon turning on the power supply to the entire circuitry, the relay RL is not energized because its control transistor TR22 is unbiassed. The "normally closed" contacts of the relay RL pass a supply to the adjustment circuitry, whilst the supply to the gas-control circuitry is cut off so that the thyristor TH receives no firing pulses and is held non-conductive.

So long as the differential amplifiers of the adjustment circuitry are unbalanced a voltage in excess of approximately one-half of the supply voltage must appear across at least one of the relay coils in the collector circuits of the differential amplifiers, so turning on at least one of the transistors TR23 to TR26 through respective base resistors R62 to R65, causing a current to flow through the common collector lead R59 and zener diode Z12 so ensuring that the zener diode Z11 remains non-conductive, thus keeping the relay driver transistor TR22 in the non-conductive state.

Once the adjustment circuitry achieves balance, the transistors TR23 to TR26 will become non-conductive causing the zener diode Z11 to conduct via the resistor R60 and thus biassing on the relay driver transistor TR22 to actuate the relay RL which changes over the supply to the gas control circuitry from the adjustment circuitry which is thus de-energized and held in the balanced position, It will be noted that the transistors TR22 to TR26 receive their supply direct and not through the relay RL so that the relay driver transistor TR22 may be both turned on and held on regardless of the state of the relay RL.

The adjustment circuitry thus remains operative until adjustment is complete, whilst the gas-control circuitry, and hence the thyristor TH are held non-operative.

Once adjustment has been completed, the adjustment circuitry is cut-off, and the gas-control circuitry energized so that charging may commence.

After a battery has been charged and the supply has been turned off, the system reverts automatically to the adjusting state only, ready for the next battery, and it will again remain in this state until adjustment is once more completed.

The current transformer CT has its primary winding inserted in series with the secondary winding of the variable transformer VT. An alternative position which is equally satisfactory is in series with the primary winding of the variable transformer VT. This current transformer is provided to limit the output of the thyristor-controlled power stage by sensing the current, comparing the output at the secondary winding of the current transformer with a standard, and using any excess signal voltage in feedback mode to reduce conduction of the thyristor thereby holding the current within safe limits. Such circuits are well known and therefore not illustrated.

What I claim and desire to secure by Letters Patent is:

1. An electronic control system for a battery charger including: means for switching on and off the charging current at repetitive intervals in order to provide an open-circuit terminal voltage during the "off" periods; means for providing a signal for controlling the magnitude of the charging current; means for extracting the resultant "I.R Drop" at the battery terminals; means for differentiating the rate of decay of the open circuit terminal voltage of the battery at the said repetitive intervals; means for deriving a voltage which is some function of the differential at the repetitive intervals; means for comparing this voltage derived from the differential with a standard voltage; and means utilizing the difference between said two voltages in order to modify the control signal whereby the magnitude of the charging current is controlled.

2. An electronic control system according to claim 1, wherein the means for switching on and off the charging current is an electronic timer comprising: an operational amplifier; feedback means for causing said amplifier to switch on and off in a predetermined cycle; means for adjusting the ON/OFF ratio of the amplifier as well as the length of the cycle; and means for blocking the passage of the control signal from the control system in the absence of an output of the amplifier, whereby the charging current is cut off when the operational amplifier is OFF.

3. An electronic control system according to claim 1, wherein the means for extracting the resultant "I.R Drop" comprises a transistor, and a differentiating circuit connected to the base electrode of said transistor for rendering said transistor temporarily conductive on application of a pulse to the differentiating circuit from the means for switching on and off the charging current, said transistor effectively shorting-out said means for differentiating the rate of decay of the terminal voltage during the time that it is rendered conductive.

4. An electronic control system according to claim 3, wherein the means for differentiating the rate of decay of the terminal voltage comprises a resistor and a capacitor, said resistor being connected in parallel with the collector-emitter path of said transistor, said capacitor being connected between one end of the resistor and one terminal of the battery to be charged.

5. An electronic control system according to claim 1, wherein the means for deriving a voltage which is some function of the differentiated rate of decay of the terminal voltage comprises: a capacitor, the capacitor being charged in each OFF part of the repetitive charging cycle from the means for differentiating the rate of decay of the terminal voltage after the "I.R Drop" has been extracted; and means for discharging the capacitor at the commencement of each OFF period of the charging cycle, the capacitor acting as a memory in storing a voltage proportional to the peak of the differentiated rate of decay of battery terminal voltage.

6. An electronic control system according to claim 5, wherein the means for discharging the capacitor comprises: a transistor whose collector-emitter path is in parallel with the capacitor and a differentiating network connected to the base electrode of the transistor; said means for switching on and off the charging current producing a negative going signal at switch off, said signal after differentiation causing the transistor to momentarily conduct and discharge the capacitor.

7. An electronic control system according to claim 1, wherein the means for comparing the derived voltage which is some function of the differential with a standard voltage comprises a differential amplifier consisting of first and second transistors, the emitter-collector path of said transistors being common on one side thereof, the first transistor receiving on its base electrode the derived voltage which is proportional to the differential whilst the second transistor receives on its base electrode a standard reference voltage.

8. An electronic control system according to claim 7, wherein the standard reference voltage is generated from a zener diode and potentiometer in parallel with one another and with the collector-emitter paths of said transistors, a tap of the potentiometer being connected to the base electrode of the second transistor.

9. An electronic control system according to claim 7, wherein an integrator, in the form of a series circuit comprising a resistor and capacitor, is associated with the uncommon collector-emitter circuit of the second transistor, the control signal being generated by said integrator as a result of the comparison between the derived voltage and the standard voltage.

10. An electronic control system according to claim 1, comprising: a filter for filtering out the rectified A.C. component of the voltage across the terminals of the battery to be charged; a capacitor-resistor differentiator for extracting the "I.R Drop" and differentiating the rate of decay of the terminal voltage across the battery during the OFF periods; a peak memory for storing at each repetitive cycle the peak value of the differentiated decay of terminal voltage; a standard voltage; a comparator for comparing the value of the peak voltage stored in the peak memory during each OFF period with the value of the standard voltage; an integrator operable from the results of said comparison in order to modify the control signal whereby the magnitude of the charging current is controlled; and a timer for switching ON and OFF said control signal and the charging current to the battery at repetitive intervals.

11. An electronic control system according to claim 10, additionally including: a second capacitor-resistor differentiator arranged in parallel with the first capacitor differentiator, said second capacitor-resistor being arranged in parallel with the first differentiator and having no means for extracting the "I.R Drop" so that the differentiated output includes the "I.R Drop;" and an AND gate arranged between the comparator and integrator for receiving the output from the comparator and the second capacitor-resistor differentiator on a pair of inputs.

12. An electronic control system according to claim 10, additionally including: an AND gate arranged between the comparator and the integrator for receiving the output from the comparator and from the capacitor-resistor differentiator on a pair of terminals.

13. An electronic control system according to claim 1, wherein the means for comparing the derived voltage which is the peak value of the differential with a standard voltage is an operational amplifier having a pair of inputs, the peak value of the differential which has been stored in a capacitor being applied to the first input of the operational amplifier, whilst a standard voltage derived across a parallel circuit comprising a zener diode and a potentiometer being applied to the second input from the tap of the potentiometer.

14. An electronic control system according to claim 1, wherein means are provided for tapping off a sample from the battery terminal voltage, in the case where the battery to be charged has a large number of cells, whereby said electronic control system is adapted to charge any battery irrespective of the number of cells and its capacity.

15. An electronic control system according to claim 14, comprising: a series circuit across the battery terminals including, a first transistor, a zener diode and a capacitor; a resistor; and a second transistor whose base electrode is connected to the junction between the zener diode and the capacitor and whose collector-emitter path is in series with said resistor across said series circuit, the junction between the second transistor and resistor being connected to the base electrode of the first transistor, and also to the means for extracting the "I.R Drop."

16. An electronic control system according to claim 14, comprising first and second transistors; a zener diode, first and second resistors; and a capacitor; said first resistor and zener diode being connected in series across the battery terminal voltage, the base electrode of the first transistor being connected to the junction between the first resistor and zener diode, the collector-emitter circuits of the two transistors being in parallel with one another, but in series with the second resistor across the battery terminal voltage, the first transistor also being in series with the capacitor, the base electrode of the second transistor being connected to the junction between the capacitor and collector-emitter path of the first transistor, the junction between the second resistor and the paralleled collector-emitter paths of the two transistors being connected to the means for extracting the "I.R Drop."

* * * * *